(12) United States Patent
Kristiansen et al.

(10) Patent No.: US 7,424,485 B2
(45) Date of Patent: Sep. 9, 2008

(54) METHOD AND APPARATUS FOR GENERATING USER INTERFACES BASED UPON AUTOMATION WITH FULL FLEXIBILITY

(75) Inventors: Freddy Kristiansen, Helsinge (DK); Jens Møller-Pedersen, Allerød (DK); Jesper Theil Hansen, Taastrup (DK); Per Bendsen, Copenhagen (DK); Peter Christensen, Hørsholm (DK); Peter Sloth, Copenhagen V (DK); Peter Villadsen, Copenhagen (DK); Uffe Kjall, Vaerloese (DK)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 10/860,306

(22) Filed: Jun. 3, 2004

(65) Prior Publication Data

US 2006/0004845 A1 Jan. 5, 2006

(51) Int. Cl.
*G06F 7/00* (2006.01)
*G06F 17/00* (2006.01)

(52) U.S. Cl. .................... 707/102; 707/101
(58) Field of Classification Search ............ 717/103, 717/109; 715/764, 513, 505, 503; 709/203; 707/3, 103, 110
See application file for complete search history.

(56) References Cited

U.S. PATENT DOCUMENTS

| | | | |
|---|---|---|---|
| 5,649,190 A * | 7/1997 | Sharif-Askary et al. ..... 707/101 |
| 5,999,948 A * | 12/1999 | Nelson et al. ............... 715/506 |
| 6,012,098 A | 1/2000 | Bayeh et al. |
| 6,657,584 B2 | 12/2003 | Cavallaro et al. |
| 6,704,743 B1 | 3/2004 | Martin |
| 7,194,683 B2 | 3/2007 | Hind et al. |
| 2002/0030625 A1 | 3/2002 | Cavallaro et al. |
| 2002/0083068 A1 | 6/2002 | Quass et al. |
| 2002/0105548 A1 * | 8/2002 | Hayton et al. ............... 345/764 |
| 2002/0111922 A1 | 8/2002 | Young et al. |
| 2003/0058277 A1 | 3/2003 | Bowman-Amuah |
| 2003/0221165 A1 | 11/2003 | Young et al. |
| 2005/0005259 A1 * | 1/2005 | Avery et al. ................. 717/103 |
| 2005/0027620 A1 | 2/2005 | Taylor et al. |
| 2005/0065777 A1 | 3/2005 | Dolan et al. |
| 2005/0234688 A1 | 10/2005 | Pinto et al. |
| 2006/0004845 A1 | 1/2006 | Kristiansen et al. |
| 2006/0235764 A1 | 10/2006 | Bamborough et al. |

OTHER PUBLICATIONS

"User Interface Markup Language (UIML) Draft Specification) Draft Specification", Harmonia, Inc., Jan. 17, 2004.
Bernstein, P.A., "Applying Model Management to Classical Meta Data Problems", Proceedings CIDP 2003, pp. 209-220, 2003.

(Continued)

*Primary Examiner*—Khanh B. Pham
*Assistant Examiner*—Thu-Nguyet Le
(74) *Attorney, Agent, or Firm*—John D. Veldhuis-Kroeze; Westman, Champlin & Kelly, P.A.

(57) ABSTRACT

A method, computer readable medium and system are provided which generate a model driven form user interface to represent an application model. The method includes selecting which of multiple different logical form types to use to generate the form user interface to represent the application model. The method also includes providing a first map. A display target independent logical form is generated using the application model, the selected form type and the first map.

21 Claims, 10 Drawing Sheets

OTHER PUBLICATIONS

Microsoft, "BizTalk Server 2004 Architecture—White Paper", Dec. 2003.
Microsoft Business Solutions, Microsoft Business Solutions—Axapta 3.0 Overview, Jul. 2003. http://microsoft.com/businessSolutions/axapta/.
Microsoft Developers Network (MSDN), Avalon, 2003. http://msdn.microsoft.com/longhorn/understanding/pillars/avalon.
"XSL Transformations", Wikipedia, http://en.wikipedia.org/wiki/XSL_Transformations, last modified Nov. 27, 2006.
Office Action dated Dec. 21, 2006 for U.S. Appl. No. 10/860,225, filed Jun. 3, 2004.
Bettin, J., "Model-Driven Architecture Implementation & Metrics", SoftMetaWare,Ltd., Version 1.1, Aug. 28, 2003.
Lämmel et al., R., "Mapping a Conceptual to a Relational Schema", Feb. 16, 2004.
Baxley, B., "Universal Model of a User Interface", http://www.aiga.org/resources/content/9/7/8/documents/baxley.pdf, at least by Apr. 26, 2004.
Karsai et al., G. "Graph Transformations In OMG's Model-Driven Architecture", http://www.isis.vanderbilt.edu/publications/archive/Karsai_G_12_0_2003_Graph_Tran.pdf, at least by Apr. 26, 2004.
Balasubramanian et al., K. "Model Driven Middleware: A New Paradigm for Developing and Provisioning Distributed Real-time and Embedded Applications", Science of Computer Programming, Nov. 14, 2003.
"Unify NXJ Forms Processing—Application Development using Unify NXJ Application Designed" NXJ Technical White Paper, at least by Apr. 26, 2004.
Kobro et al., R. "What is Model Driven Architecture?" University of Oslo, Research Report 304, ISBN 82-7368-256-0, ISSN 0806-3036, Mar. 2003.
Office Action dated Jan. 10, 2007 for U.S. Appl. No. 10/860,226, filed Jun. 3, 2004.
Office Action dated Jun. 28, 2006 for U.S. Appl. No. 10/860,225, filed Jun. 3, 2004.

* cited by examiner

METHOD AND APPARATUS FOR GENERATING USER INTERFACES BASED UPON AUTOMATION WITH FULL FLEXIBILITY

CROSS-REFERENCE TO RELATED APPLICATIONS

Reference is hereby made to the following co-pending and commonly assigned patent applications U.S. application Ser. No. 10/860,226, filed Jun. 3, 2004, entitled "METHOD AND APPARATUS FOR GENERATING FORMS USING FORM TYPES" and U.S. application Ser. No. 10/860,225, filed Jun. 3, 2004, entitled "METHOD AND APPARATUS FOR MAPPING A DATA MODEL TO A USER INTERFACE MODEL", both of which are hereby incorporated by reference in their entirety.

BACKGROUND OF THE INVENTION

The present invention relates to the generation of forms. More particularly, the present invention relates to methods and apparatus for generating form user interfaces (UIs).

In typical business software products and applications, such as enterprise resource planning (ERP) systems and customer relationship management (CRM) systems, a large number of forms or form user interfaces are used. A form is a window, a dialog, a page, or another UI element for viewing and/or entering data. It is not uncommon for the number of forms which are used in conjunction with a business software application to exceed several thousand. Developing a large number of forms has traditionally been a labor-intensive task for software developers.

Further, complexity in business application such as ERP systems, CRM systems, and other forms based applications is growing. This is caused by a number of factors including: (1) an increasing number of forms in each system which is due to increased functionality; (2) an increasing focus on usability originating from end users who have become accustomed to web page usability; (3) an increasing number of different platforms, devices, and technologies; (4) an increasing focus on security which can result in different forms depending on user rights; and (5) an increasing demand on flexibility, efficiency, and personalization. At the same time there is a push to develop system faster and with higher quality.

As an example of a real life business application, consider Microsoft Business Solutions-Axapta®, which has close to 3,000 tables, resulting in close to 2,000 forms. Each form has to be aligned with the layout of each table from which the run-time data is bound. The forms and related form logic have to be aligned whenever the table layout changes and when business logic changes. Adding to the complexity is the increasing number of different client platform technologies. The classic Windows UI is now accompanied by the Web Browser. In the near future, personal digital assistant (PDA), cell phone, and other UI technologies will be adding to complexity.

The Internet has taught end users that they do not need a 14 day course to learn how to use an application. End users expect applications to guide them via tasks, and they expect the application to look appealing. Because more user roles are exposed to the information technology presented through business applications, there is an increasing demand that forms reflect the information each user needs and the tasks that each role has to achieve. All in all the demands on user experience are increasing.

Typically, the user experience and developer experience pull in opposite directions. Good user experience takes longer for an application developer to create and maintain. The vision of having an excellent user experience, and at the same time, supporting high developer productivity, can seem contradictory. This is particularly true in the area of forms generation for business applications.

Applications presenting information must provide their users with as rich an experience as possible on platforms of very diverse capabilities (ranging from rich clients running on the user's desktop, to Web clients running in the user's browser, to Pocket Digital assistants, telephony based devices, and even speech interfaces). A business architect uses his or her knowledge in business engineering to solve problems for the customer. This person is not a computer program developer, and should be protected from the intricacies of program development.

The present invention provides solutions to one or more of the above-described problems and/or provides other advantages over the prior art.

SUMMARY OF THE INVENTION

A method, computer readable medium and system are provided which generate a model driven form user interface to represent an application/business model (also referred to as a data model or a problem domain model). The method includes selecting which of multiple different logical form types to apply to a logical form to generate the form user interface to represent the application model. The method also includes providing a first map. A display target independent logical form is generated using the application model, the selected form type and the first map. In embodiments of the present invention, the first map is a declarative map, though it may have imperatively defined functions or aspects in some embodiments.

Generating the display target independent logical form using the first map includes mapping property types of datum of the application model to display target independent logical controls in the display target independent logical form. In some embodiments, the first map is external to a mapping engine used to generate the display target independent logical form.

In some embodiments, declaratively applied behaviors add functionality to the display target independent logical form. The declaratively applied behaviors are attached to the display target independent logical form, and are activated by events in the form. The declarative behaviors can be patterns of logic which, depending upon values and properties of the logical controls, set properties on other controls.

The method can also include the further step of mapping the logical form to a physical form using a second map. While the logical form contains a plurality of logical controls, the physical form has a plurality of physical controls available for use in rendering the logical form on a display target. Mapping the logical form to the physical form using the second map includes mapping each of the logical controls in the logical form to one of the plurality of available physical controls. It typically also includes mapping to a specific layout for the particular form type on the particular display target.

Other features and benefits that characterize embodiments of the present invention will be apparent upon reading the following detailed description and review of the associated drawings.

BRIEF DESCRIPTION OF THE DRAWINGS

FIG. 3-1 is a diagrammatic illustration of the use of form types of the present invention to generate logical forms and physical forms.

FIG. 3-2 is a diagrammatic illustration of the use of form types as shown in FIG. 3-1, and further illustrating the relationship between form types and the generation of logical forms and physical forms.

FIG. 4-1 is a block diagram illustrating an example business model.

FIG. 4-2 is a block diagram illustrating an entity business model mapped to a form.

FIG. 5-1 is a block diagram illustrating a process of generating models using maps and other models.

FIG. 5-2 is a block diagram illustrating a process of generating a display target specific model from an initial application or business model through a series of mappings.

FIG. 5-3 is a block diagram illustrating a process of the type shown in FIGS. 4-1 and 4-2 for an example embodiment.

FIG. 5-4 is a block diagram illustrating an example mapping process in which a business model entity is first mapped to a display target independent form, with the entity properties mapped to controls to create a display target independent logical form, and then the logical form is mapped to the display target(s).

DETAILED DESCRIPTION OF ILLUSTRATIVE EMBODIMENTS

With the ever increasing complexity in business applications and other administrative or forms based software applications, the demand for automation is increasing. The present invention provides a method of facilitating and enhancing such automation. The present invention utilizes an automated and declarative approach for developing user interfaces without jeopardizing the freedom to innovate.

Using the systems and methods of the present invention, application developers can focus on developing a business model. The business model (UML, ER diagram, class, etc.) is later mapped to a technology independent intermediate format which again—in one or more steps—is mapped to the display target specific technology and layout (Windows, Web Browser, PDA, phone, etc). Framework developers can then, independently of the application developers, enrich the display target specific technology, and have it apply to the entire developed application. The intermediate format is created once per form and used across several display targets. The mapping is inherently flexible due to open and changeable maps used by the mapping engines. The intermediate UI models and the final display target formats are also open and changeable allowing for a unique level of flexibility. The following discussions illustrated the inventive concepts further.

Figure 1:
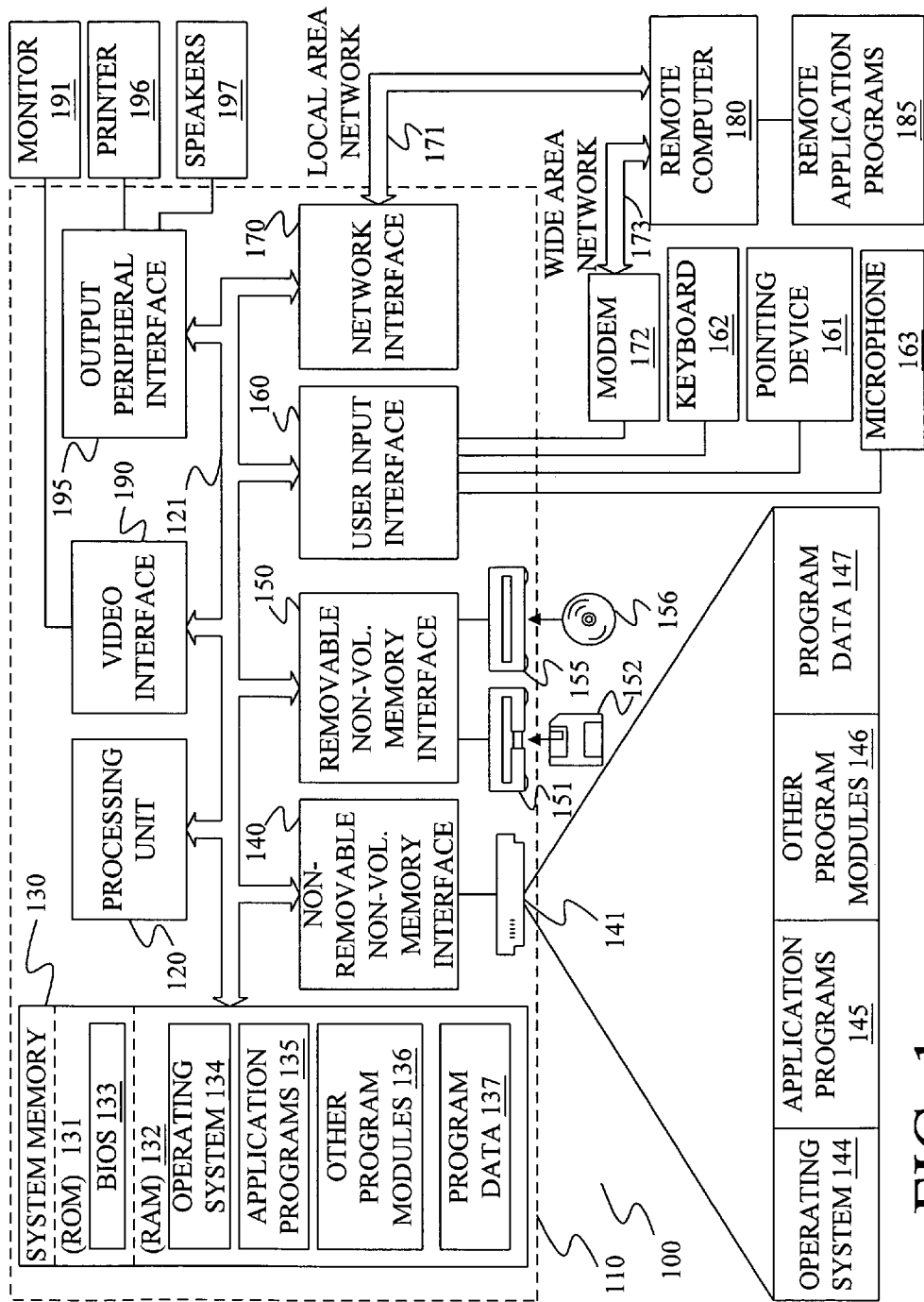
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. A particular group of application programs are called business applications. These are targeted at the management of companies including—but not limited to—handling the general ledger, inventory, salaries, customers, sales, purchases, financial reports and any other data relevant for a business.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). The input devices are used for creating, modifying, and deleting data. Input devices can also be used for controlling (starting and stopping) the application programs and particular functions herein. The functions include opening (showing) forms and closing the forms. A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. The monitor or other display device is used to show (render) forms.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
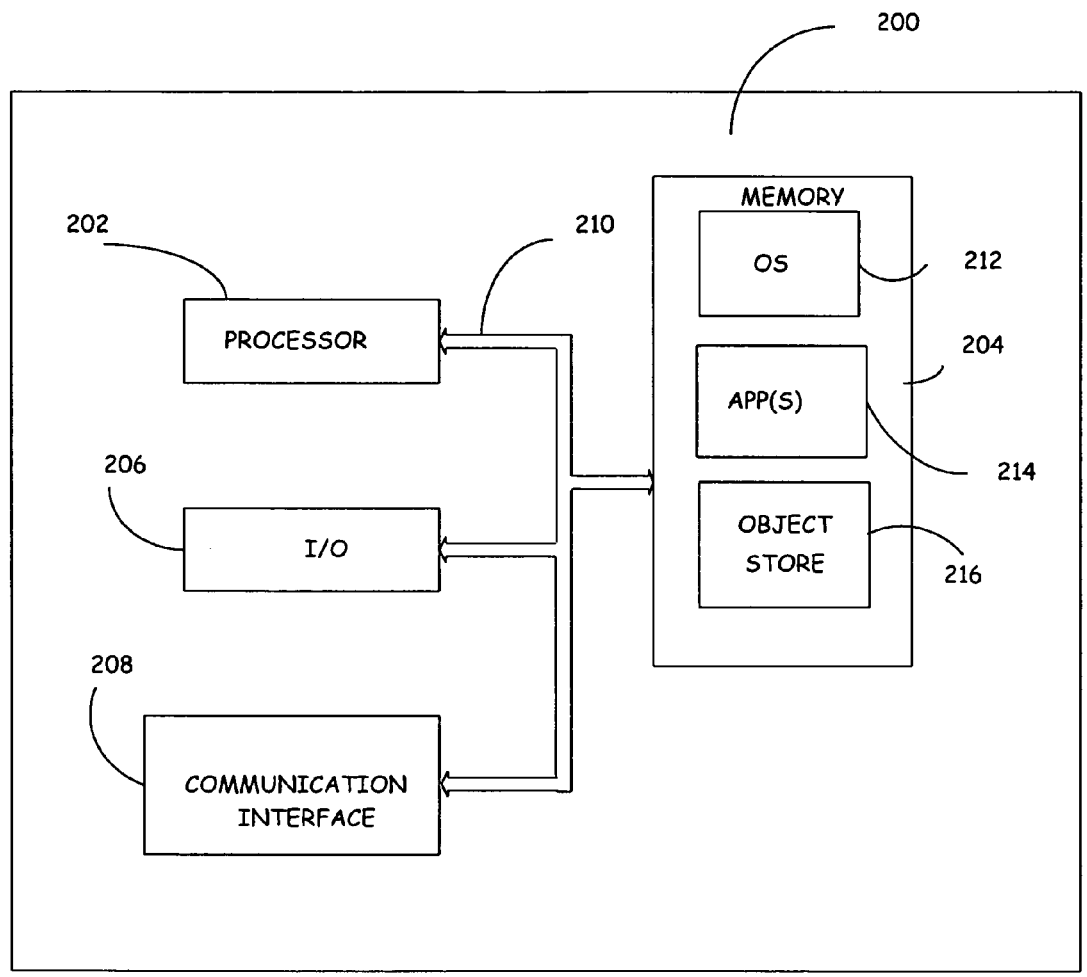
FIG. 2 is a block diagram of a general mobile computing environment in which the present invention can be implemented.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Layered and Mapped UI Architecture and Method

As described above, applications presenting information must provide users with as rich an experience as possible on platforms (for example display targets) of very diverse capabilities. These platforms range from rich clients running on the user's desktop, to Web clients running in the user's browser, to PDAs, to telephony based devices, and even speech interfaces. Other platforms are also possible. In accordance with embodiments of the present invention, a schema is employed that prescriptively defines how data types map onto native controls on the platform in question.

A business architect uses his or her knowledge in business engineering to solve problems for his or her customers. However, this person is typically not a computer program developer, and is ideally protected from the intricacies of program development. The present invention provides methods and apparatus which allow a business architect (user) to focus on the business logic of an application, and not on how data is presented on a given platform. The presented invention allows application developers to, based on a model of the business, derive the user interface which targets multiple display targets and which exploit the technological capabilities of each display target.

This is achieved by a layered UI definition which allows the developer to focus the intellectual effort to the layer which has the "right" level of abstraction. Patterns are captured and re-used at each abstraction level. Maps—from higher levels of abstraction to more specific levels—capture patterns in the mapping process, but also allow the application developer to fine tune the results. The present invention uses these maps, along with controls, logical form types and behaviors, to map the business model to display target specific physical models.

In the methods of the present invention, the business model is the master. The intellectual work put into the business model is preserved and used as basis for generating the user interface. The model can be described in Unified Modeling Language (UML), enterprise resource (ER) diagram or any other graphical or non-graphical modeling language. Business models can also be found in classic object oriented programs, in relational databases, or in other formats. As described below, in some exemplary embodiments of the present invention, the business models is a class hierarchy of entities with properties.

In embodiments of the present invention, the business model is mapped to an intermediate model of the user interface which is independent of the display target. The UI model is described in a high level of abstraction allowing the application developer to view and modify it without needing any technical knowledge of the final display target. Code can be added to the UI model which will work for all display targets. Patterns in the UI models are captured and they can be re-used, resulting in a homogeneous UI. The building blocks used to describe the UI model can also be extended.

As will be described below in greater detail, in some embodiments of the invention the entities are mapped to a UI model called "the logical UI" which includes a logical form with logical controls. The entities and properties are mapped to respectively logical forms and logical controls at design time. At runtime the logical forms and logical controls data bind to the entities and properties. The patterns in the forms are called form types. The forms and controls are used by, but are not a part of, the core client mapping engine. The core client is the display target independent part of the UI client In embodiments of the invention, the list of logical controls and form types can be extended. A further discussion of these aspects of the invention is also provided below.

In some embodiments of the invention, the UI model is mapped to a display target specific markup language such as the active server page language (ASP.NET), the wireless markup language (WML), the hypertext markup language (HTML), etc. The UI model can also be mapped to other display technologies (for example, Win32, WinForms, PocketPC). In one particular example embodiment of the invention, the logical forms are mapped to a Web Client display target, a WinForms Client display target, etc., and new display targets can dynamically be added.

In accordance with embodiments of the invention, the mappings are based on declarative maps which are open and changeable. Patterns in the UI are captured in the maps. The maps can be done based on several conditions which results in a high level of flexibility. The different models can be modified manually (including through code) after they have been mapped. This gives the developer the final level of flexibility. The dynamic nature of the maps allows for development and use of new UI elements such as controls. New controls are simply enabled on a form, by mapping properties to the new controls. The new controls must abide to a certain contract—in this embodiment the new controls must inherit from a specified base class. At runtime, the logical form binds to the entities and the display target binds to the logical layer. This allows all functionality which is common between the display targets (security, personalization, intra form logic) to be implemented once in the logical layer and used in many instances.

Form Types

The present invention utilizes the concepts of logical forms and logical form types to provide a new method of building form user interfaces (forms) for business and other applications. While in exemplary embodiments or implementations of the invention logical forms and logical form types are used, the use of the logical layer is not required in all embodiments. Thus, the present invention applies to the use of form types to create forms in general. Business applications of today typically consists of a large number of forms which often fall into a few categories or follow a similar pattern. The number of categories is typically between two and twenty, but more can be defined. The form types of the present invention facilitate model-driven user interfaces by preserving and acting on the business or application model both at design-time and at run-time. This provides a high level of abstraction to a software developer. Further, the use of form types in accordance with the present invention ensures re-use (one layout is used many times), a much more homogeneous set of form user interfaces since all forms fall into a few distinct types, and forms that are easier to maintain (the layout of the type can be changed without changing the form and a different type can be applied without changing the form). The invention ensures that application developers have complete control, across multiple display targets, of the look and feel of the application and how navigation within the application takes place. Examples of display targets include each of the multiple types of current and future operating systems, as well as each of the many available or future mobile devices. As another example, each rendering technology on a particular operating system can also be a display target.

Using the concepts of the present invention, a logical form contains display target independent logical controls, which makes the logical form independent of display targets itself. A logical form refers to a logical form type which defines the pattern that the logical form must follow. The logical form type referred to by a logical form can be selected from multiple different logical form types to quickly establish the look and contents of the logical form. In embodiments of the present invention, the logical form types are models that, when combined with a business or other application model, results in the generation of a logical form.

The logical form type exposes the schema (which describes the structure of the form, which elements it can contain, etc.) that the form must conform to, the Maps (or Rules) which map (automatically or manually via an application developer) the business model to the logical model and from this to the physical model. Further, the form type can contain code modifying the dynamic behavior of the (logical) form. Hence, form types expose style and layout information, and other types of information specific to a display target. However, since they also specify rules for the logical form and its contents they play a much bigger role. Certain aspects of the form types of the present invention are introduced as follows:

Different Form Types

As mentioned, in a typical use of the present invention, multiple different form types are provided for use by an application developer in creating forms. For example, in one example embodiment, form types could include a Dialog form type, a Card or CardView form type, a ListView form type, an EntityOverview form type, and an ActivityCenter form type. These form types correspond to typical different categories of forms used in a business application in one example. Thus, providing the multiple form types allows application developers to build all the forms that make up a state-of-the-art business application. As will be understood by those of skill in the art, these particular form types are simply an example, and the present invention is not limited to any particular form types or to any particular number of form types.

Form Type Layout

The contents and structure of the layout information may be different for each form type. Further, the layout information may be display target specific. For instance, the layout information for the ActivityCenter form type could have support for Themes/Skins/Styles and Master Pages which will be used by the HTML (i.e., World Wide Web or Internet) display target for displaying the form on a particular operating system platform. This gives the business developer the freedom to innovate on different display targets and tweak the form user interface as much as needed.

Pluggable and Extensible

Form types offer full flexibility and extensibility as an independent software vendor (ISV) can modify or extend them and create new form types, thereby changing the look and feel for the entire application.

Figures 1, 3:
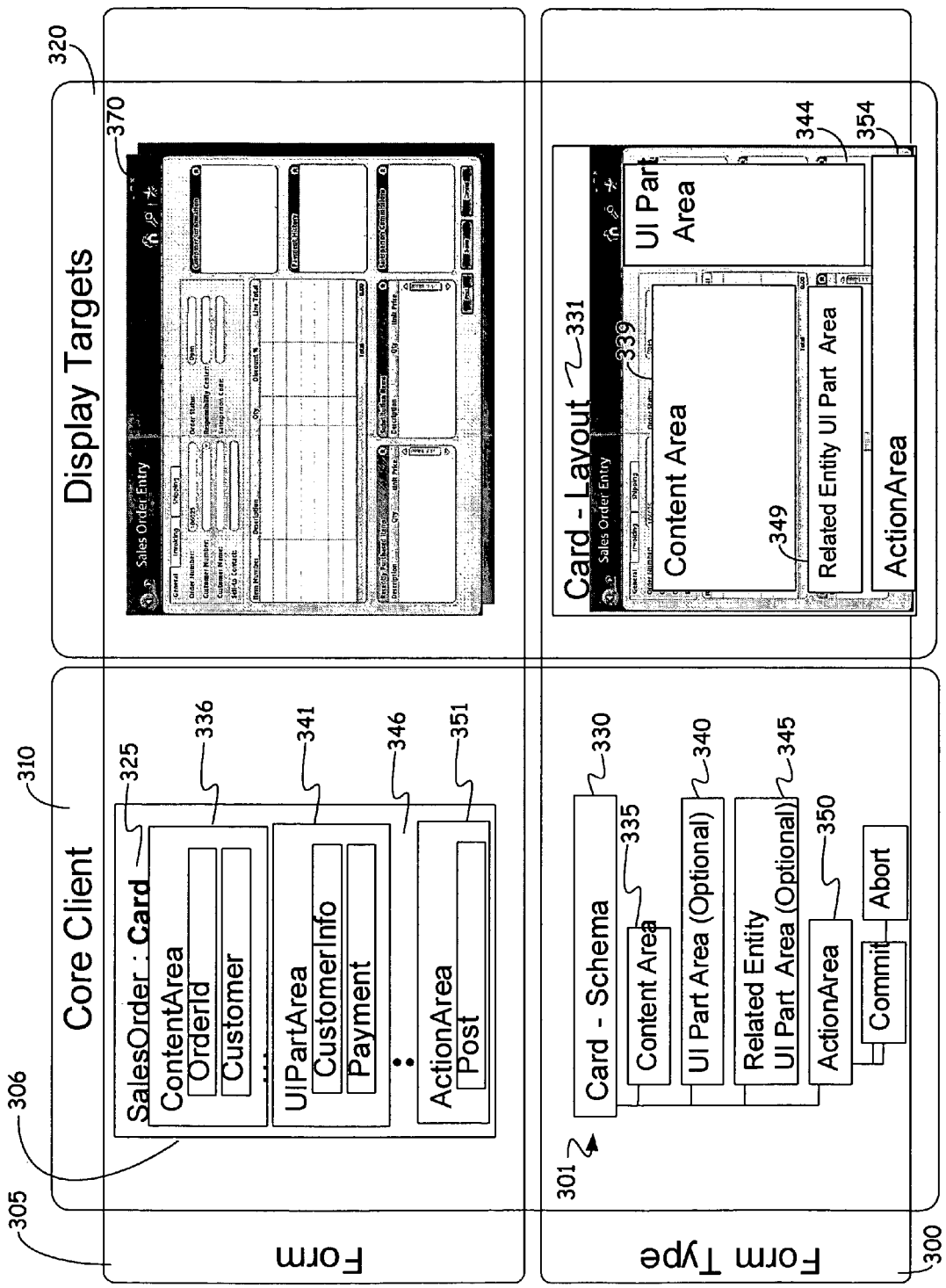
Figures 2, 3:
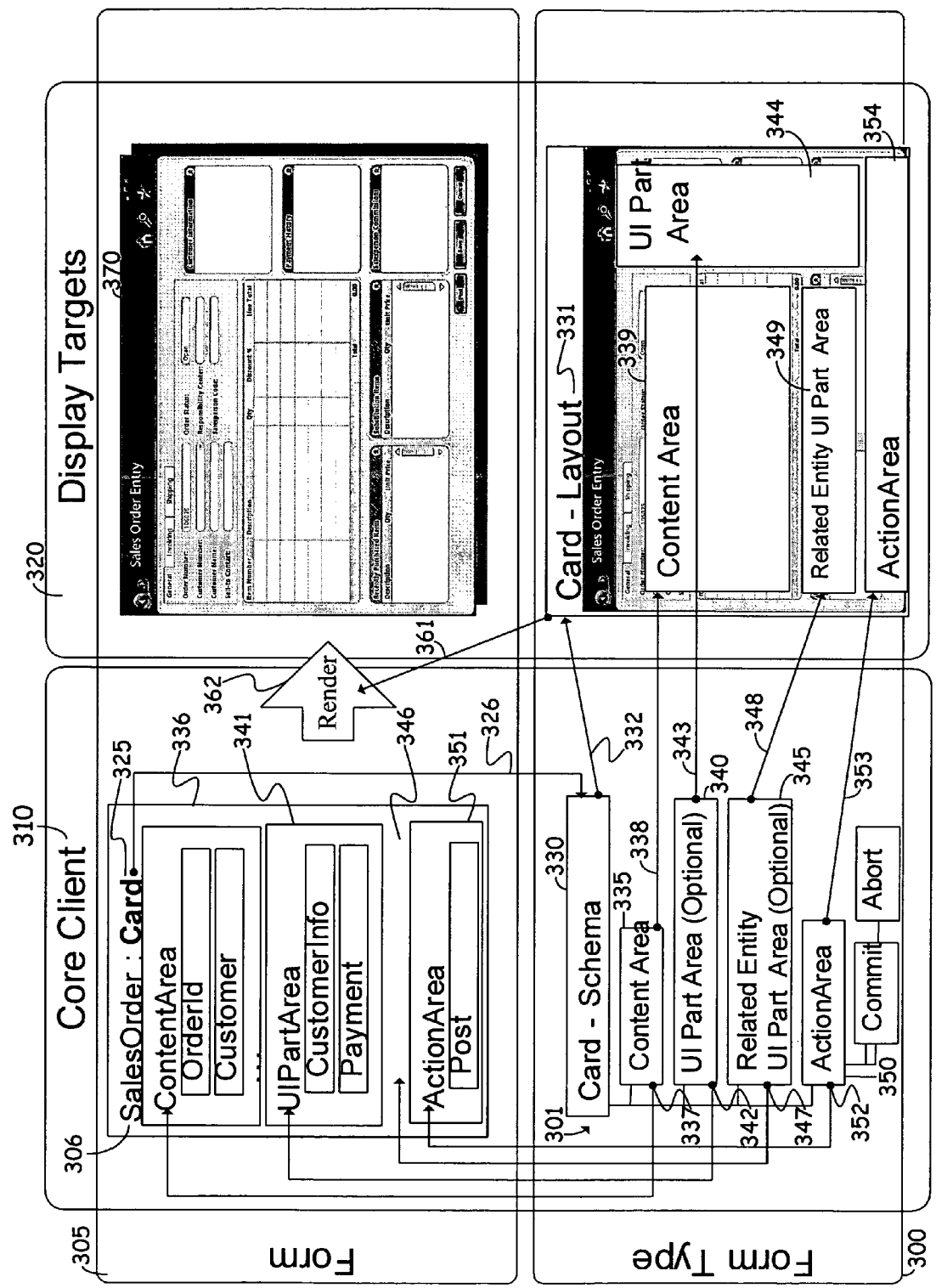

Referring now to FIGS. 3-1 and 3-2, shown are diagrammatic illustrations of a Sales Order logical form created using a Card form type in accordance with an example embodiment of the present invention. In this example, the Sales Order logical form contains a set of logical controls grouped into three different logical control groups. As will be described further below, the Card form type defines how and where the controls will appear on the physical forms on different display targets. FIGS. 3-1 and 3-2 illustrate the same information, with FIG. 3-2 including arrows illustrating relationships and origins of information between the logical form type and the logical form, and the generation of a physical form from the logical form.

FIGS. 3-1 and 3-2 diagrammatically illustrate a form instance 305 generated using a form type 300. On a core client 310, form instance 305 is logical form 306 (shown as a conceptual model of a form) and form type 300 is a logical form type 301. On a display target 320, form 305 is a rendered form 370 created using logical form 306, and ultimately from logical form type 301. Rendered form 370 is one particular implementation, but many other implementations or renderings can be achieved. The rendered form 370 can also be referred to as a physical form.

Form type 300 includes two parts, a schema 330 that defines what has to be included in particular forms using the form type, and a layout 331 that includes controls which specify how the form should be rendered or drawn on a specific display target. A form type can also include a code-behind class. By having different layouts which can be used by a form type, the forms created using the form type can be tailored to different display targets (e.g., cell phone displays, personal digital assistant displays, personal computer monitors, etc.). With form type 300 representing a captured pattern to be used in multiple forms, multiple form instances 305 can be generated using form type 300.

Consider for this example a process that a developer could go through to create a form for a Sales Order entity or object model (i.e., the business or application model). First, the developer could look to see which kinds of forms he or she has to choose from. Selecting the "Card" form type, as shown at 325 in FIGS. 3-1 and 3-2, calls up or designates the Card Schema 330 as is represented by arrow 326 in FIG. 3-2.

When the developer specifies a particular form type and associated schema, he or she is in some embodiments choosing to include in the form the information or fields dictated by the schema, with meta data from the user's business or other model populating the field values. For example, by selecting the Card form type 301 (and associated Card schema 330), the logical form 306 will include a Content Area 336 corresponding to Content Area 335 defined in the schema 330. The origin of Content Area 336 corresponding to Content Area 335 is represented by arrow 337 in FIG. 3-2. Likewise, because the schema 330 of the Card form type includes a UI Part Area 340, a Related Entity UI Part Area 345, and an Action Area 350, the logical form 306 includes these areas or fields as well as shown at 341, 346 and 351. Again, the origins of these fields are represented diagrammatically by arrows 342, 347 and 352.

As mentioned above, each form type also includes at least one layout 331 (usually one per display target) that includes controls which specify how the form should be rendered or drawn on a specific display target. As shown diagrammatically in FIGS. 3-1 and 3-2, the layout for the card form type includes controls which cause a display target 320 to include a Content Area 339, a UI Part Area 344, a Related Entity IU Part Area 349, and an Action Area 354. Arrows 338, 343, 348 and 353 illustrate the correlation of these areas in the card layout to their corresponding areas in the Card schema. The logical form 306, which is generated using the selected logical form type and meta data from the application model (in this example a Sales Order entity), is rendered as a physical form 370 on display target 320. This process is illustrated in FIG. 3-2 using arrows 361 and 362.

Models and Maps

Many information systems use models. Examples of models are: object diagrams, Extensible Markup Language (XML) schemas, database definitions, and form definitions. A model is often identified as a set of objects, each of which has properties, compositions, and associations. In business UIs, the control hierarchies used to render the forms can be regarded as models, such as Windows control trees and Hypertext Markup Language (HTML) object models. Also, syntax such as Unified Modeling Language (UML) can be used to define a model (e.g., the class definitions). In an example framework used to illustrate the methods of the present invention, applications are modeled using business entities. Thus, the business model consists of these business objects called entities, relations between entities, and properties on the entities. See for an example of a simple model 380 the entities 381, 382, 383 and 384 shown in FIG. 4-1. The entities have properties (see for example properties 385 of entity 381) and relationships with other entities (see for example relationship 386 between entities 381 and 384).

When a model is transformed into another model, a map is used explicitly or sometimes implicitly. Maps describe the relationships between models. Some examples include: Extensible Stylesheet Language Transformation (XSLT) which is intended to map XML to XML; controls which are used to render an object model on a specific device surface; mappings of orders from one application to another (because orders in different applications may have different formats); and Computer Aided Software Engineering (CASE) tools which map UML to class definitions.

In current business applications, maps are mostly programmed using object-at-a-time mappings, meaning that mappings are coded as "switch" statements in code, which take a particular object as input and return another object. Thus, conventional business applications typically use imperative maps, maps written in the code of a typical programming language. By using model-at-a-time in accordance with the present invention, it is submitted that productivity can be improved by an order of magnitude. Besides productivity gain, there is a mental gain in perceiving the UI generation problem as a mapping of models to other models using maps. Further, another benefit is the higher abstraction level found in the declaratively defined maps of the present invention. The present invention allows the maps to be explicit and declarative. In the present invention, the maps can be either declarative or imperative (due to the fact that one can override the mapping in code).

The explicit nature of the maps means that the maps are external to the generation engine used to do the mapping or rendering, and that the maps are themselves models. Stated another way, the explicit nature of the maps means that they are defined separately from the controls and the forms. Conventionally, this mapping has been done implicitly inside the controls code or forms code. The declarative nature of the maps means that the maps are not imperative (coded in a typical programming language). As used herein, the phrase "declaratively defined" means that the maps are not just defined in code as has conventionally been the case, but they are defined in a format which allows the maps to easily be changed. Examples of a declaratively defined format include, but are not restricted to, XML documents, comma-separated files, BizTalk Maps (mapping one data schema to another), and MBF Entity Maps (mapping an object model to a database schema). A wide variety of declarative mapping formats can be used in accordance with the present invention, and which format is chosen is not of particular importance. It is important that the declarative map have a limited set of possibilities, therefore making it easier to provide an intuitive design tool to define the map. In contrast, an imperative map (using code) has nearly unlimited possibilities through the programming language, and therefore it is extremely difficult to create an intuitive design tool. Instead, programming skills are required to create it.

It must be noted that in embodiments of the present invention using declarative maps, the maps need not be only declarative. In instances where it is necessary to create a map that is too complex to be defined declaratively, imperative mapping aspects can be included in the otherwise declarative map. For example, complex functions can be created and included in the map. An example could be that if an Invoice Address and Shipping Address are nearly the same, then only the Invoice Address is shown on the Form. The algorithm for determining whether two addresses are nearly the same could be an implicitly defined function used in the Map.

The present invention provides programming abstractions and a prescriptive architecture suitable for the development and deployment of business applications based on a distributed, service-oriented architecture. The framework insulates business logic written to these abstractions from changes to underlying technologies, preserving the critical asset of a business application development team. The present invention extends approaches to model-driven development, moving from a design-time model with code generation to having true "model aware application services", which can interpret the business model at runtime.

Model-Driven UI Based on Maps

Having the application model is an important feature when generating the UI for a business application built in embodiments of the present invention. A large majority of the UI can be generated solely based on the model of the business logic and maps. When an application developer has modeled a new entity, the UI is derived from this. This is illustrated diagrammatically in FIG. 4-2 which illustrates business model 380 being mapped (as shown at 388) to a UI model 390. Arrow 388 represents the mapping process, as well as a suitably configured mapping engine which uses a map to conduct the mapping process.

Although this mapping can be achieved using traditional coding techniques, the mapping is not as straightforward if certain challenges are to be met. The challenge is that when new property types are created and used in an entity, the coded transformation might not know how to handle the new type and the transformation therefore has to be modified and re-compiled. Another challenge is handling newly developed controls that will only be of value if they are included in the transformation—again this results in re-programming the transformation. The mapping techniques of the present invention are able to meet these challenges. Note that any modification of the UI at runtime (through code) can also be considered a mapping. The platform used in the present invention exposes a layered UI model, and uses maps to transform models from one layer to another. This is described below in greater detail.

The methods and apparatus of the present invention provide a way of calculating how to present business information to the user on a given platform. The invention builds upon the mapping of models onto other models, working from a very abstract model (describing the business entities to interact with) to a concrete model (specifying exactly which device specific control should be used to render the business information). In general, this mapping may involve any number of steps.

Figures 1, 5:
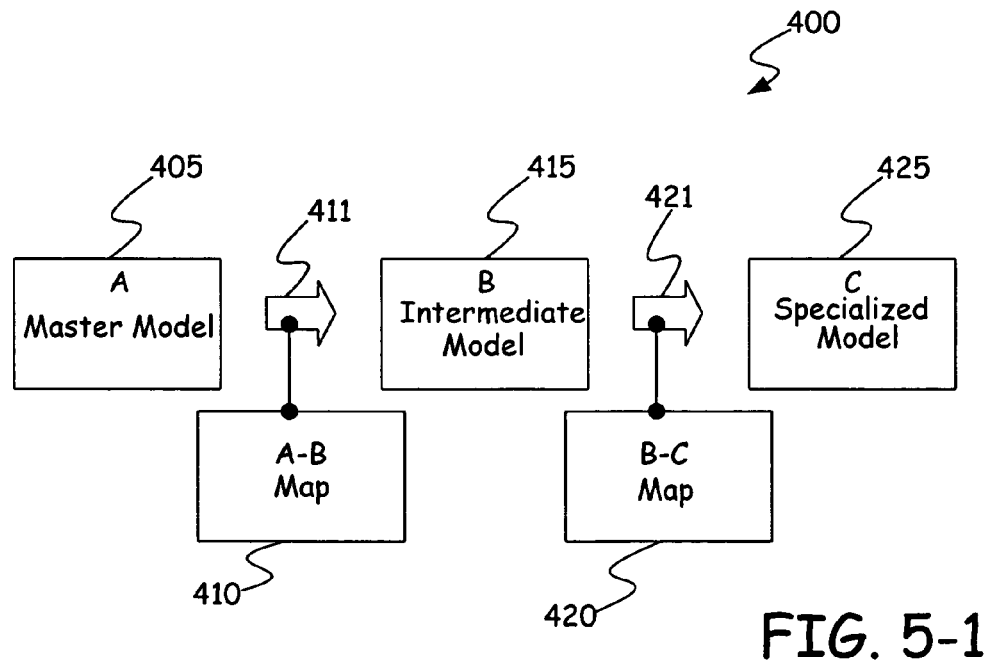
Figures 3, 5:
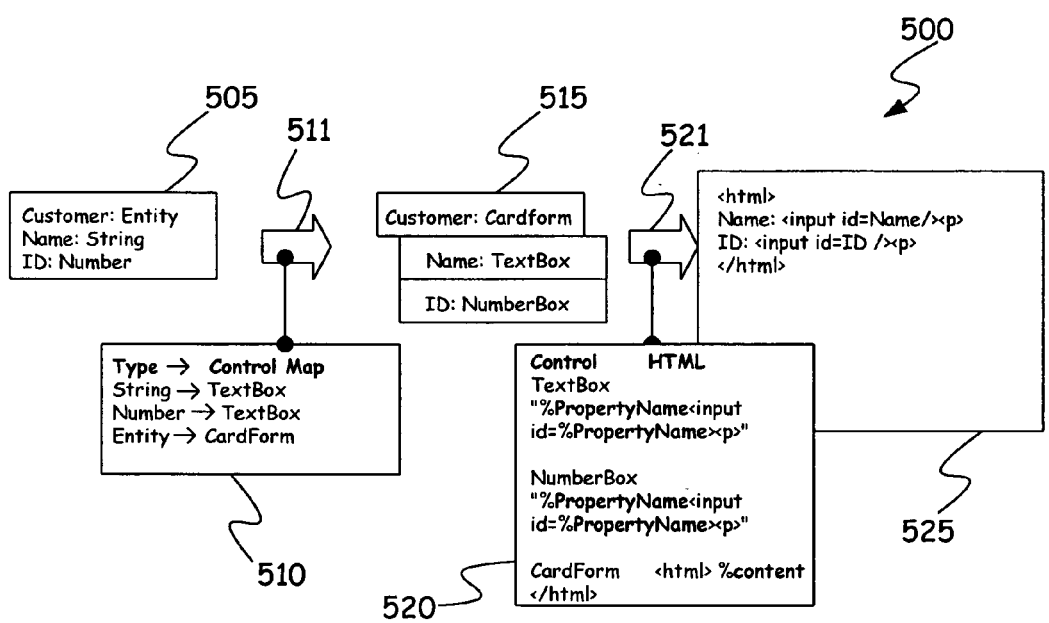
Figures 2, 5:
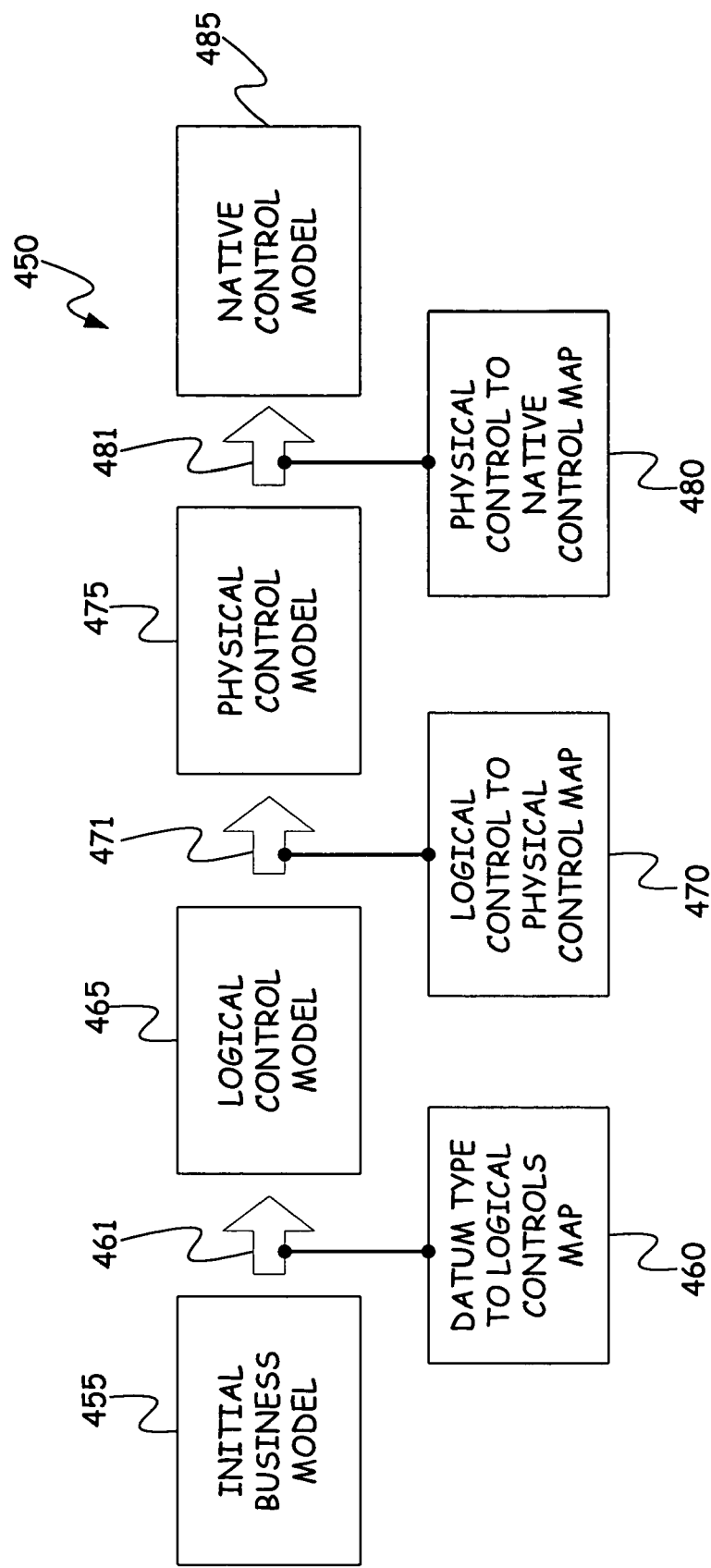
Figures 4, 5:
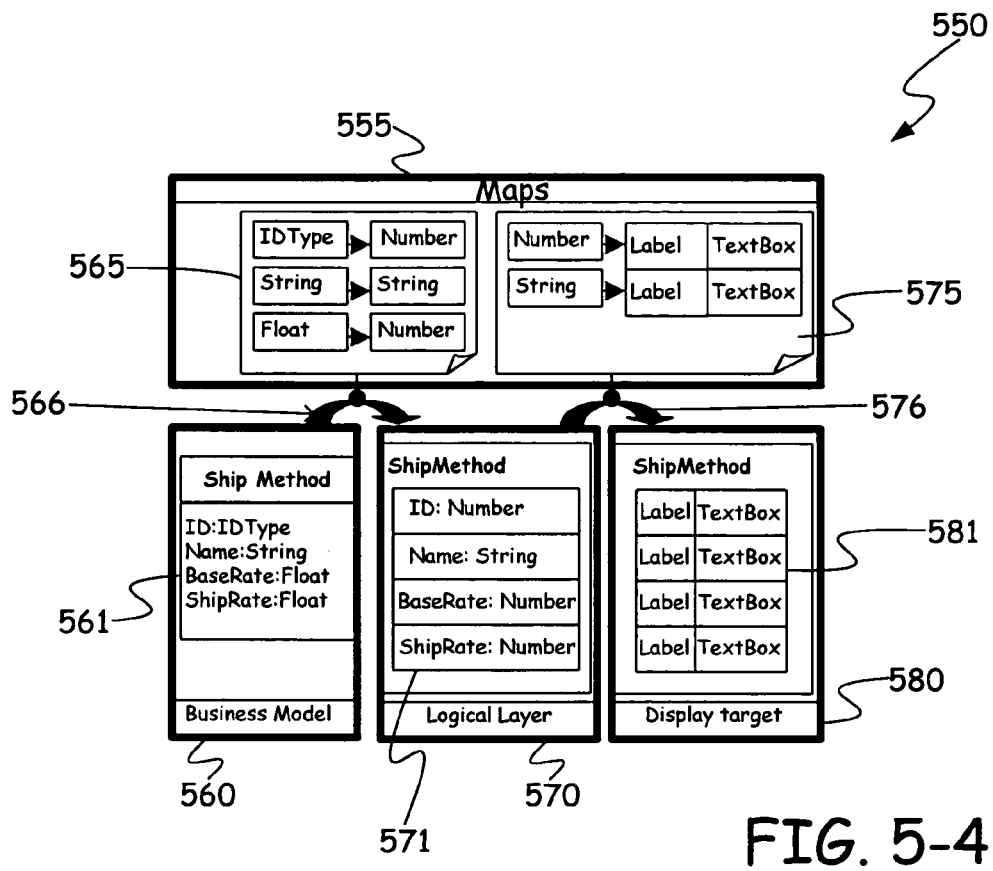

For example, consider the block diagram 400 shown in FIG. 5-1 which illustrates a process of mapping from a master model 405 to a specialized model 425 using two explicit and declarative mapping steps. Master model 405 (i.e., "model A") can be, for example, a database, table, entity, object, or other types of models in a problem domain specific to a user. Master model 405 is mapped to an intermediate model 415 (i.e., "model B") with the mapping step illustrated at 411 using a map 410 (i.e., "A-B map"). Intermediate model 415 can be a display target independent model having logical controls, as will be described below in greater detail. Intermediate model 415 is then mapped to a specialized model 425 (i.e., "model C") with the mapping step illustrated at 421 using a second map 420 (i.e., "B-C Map"). Specialized model 425 can be a display target specific model having physical controls, as will also be described below in greater detail. The arrows used to represent mapping steps 411 and 421 also represent mapping engines which are configured to utilize maps 410 and 420 to implement the mapping steps.

In accordance with some embodiments of the present invention, the mapping scheme involved in determining how to allow the user to interact with business information on the client platform involves at least three steps, as described below and as shown diagrammatically in block diagram 450 of FIG. 5-2. The initial model 455 (see also master model 405 shown in FIG. 5-1) contains information about the business entities that the user must interact with. Each datum of this application model is of a particular type. The first step involves determining which logical control to employ for a given type (string, integer, decimal type representing monetary values, addresses containing other values etc) of datum to present.

The logical control to use for the given type is determined using a mapping from data type in model 455 onto logical control in model 465. The mapping process is illustrated at 461, and utilizes a map 460 (i.e., the "datum type to logical control map"). Logical controls have several useful properties. They are completely free from dependencies to any specific display target, but hold properties that govern the behavior of device specific physical controls. The lookup of the logical control is performed taking the type hierarchy into account. If no logical control is specifically suitable for encapsulating the properties of a specific type, the search continues with a base type, until a logical control is found to handle the type.

Once a logical control has been identified from the type of data to represented, the physical control used to actually perform the rendering on the given platform must be found. These physical controls are sometimes referred to as "adapters". This is done using another mapping, yielding the physical control from the logical control and the display target. The mapping process is illustrated at 471, and uses map 470 (i.e., the "logical control to physical control map") to generate physical control model 475 from logical control model 465.

When the client runs on the user's display target, the physical control will be used to create instances of the native controls used to interact with the user. This is done by a third mapping, yielding a set of native controls from the physical control. For instance, if the physical control was an address control, the physical control would map onto native controls for street, city, country. The mapping process is illustrated at 481, and uses map 480 (i.e., the "physical control to native control map") to generate native control model 485 from physical control model 475. In some embodiments, this is an imperative map—but it does not have to be. Again, arrows 461, 471 and 481 also represent the mapping engine(s) used to implement the mapping functions as specified by maps 460, 470 and 480.

The mapping described above may be augmented with other mappings to achieve the desired result. Other factors include the type of form rendered (card or list view), the user role (possibly restricting the information offered to the user). The process of arriving from the abstract model to the concrete model is purely prescriptive (by describing the mappings involved), and flexibility is afforded by being able to change these mappings.

As another example, FIG. 5-3 illustrates a block diagram 500 showing a mapping process for getting from a customer's name and identification number (ID) to the HTML used to render this information in a browser. The master or initial business model 505 is an entity (or object) or class of entities (or class of objects) having the customer's name and ID as properties. The "Name" and "ID" properties of model 505 are of types "String" and "Number", respectively. Model 505 is mapped to a logical control layer of model 515 using a prescriptive map 510. The mapping process is represented at 511. In this example, the data type "String" is mapped to a "TextBox" logical control, while the data type "Number" is mapped to a "NumberBox" logical control.

Next, logical control model 515 is mapped to an HTML model 525 using map 520. The mapping process is represented at 521. In this example, model 525 is a physical control model in the form of an HTML model. Thus, map 520 maps the logical controls of model 515 to HTML tags or elements in model 525. HTML model 525 is then used to render the information from model 505 in a browser. Again, the arrows used to represent mapping steps 511 and 521 also represent suitably configured mapping engines which utilize maps 510 and 520 to implement the mapping process.

Figures 1, 4:
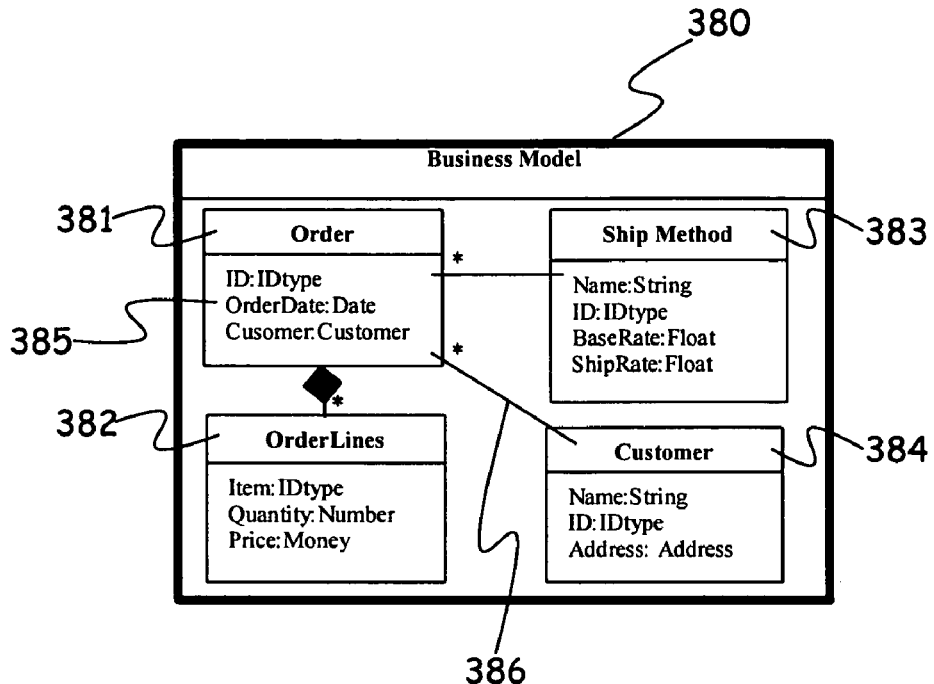
Figures 2, 4:
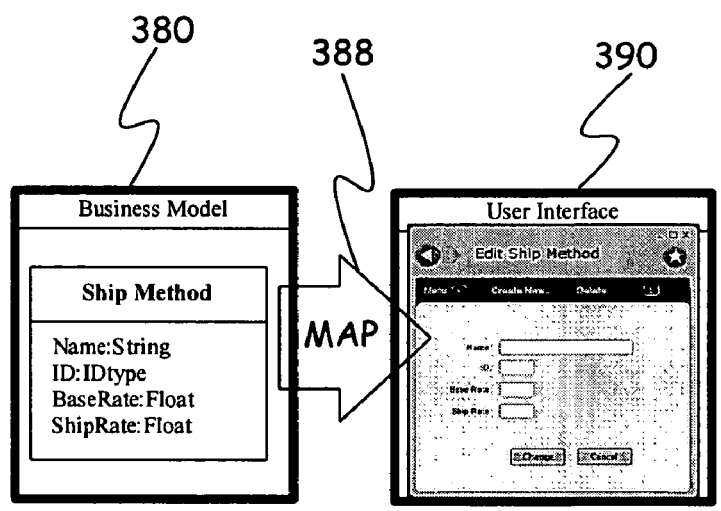

FIG. 5-4 illustrates a further aspect of embodiments of the present invention in which several different property types can be mapped to the same final controls, so the number of required controls does not necessarily increase when the number of property types increases. As shown in the block diagram 550 of FIG. 5, a business model 560 having properties 561 of different types is mapped to a display target model 580 using maps 555. Similar to previously discussed examples, model 560 is mapped to a logical layer model 570 having logical controls 571. The mapping engine and mapping process, which use map 565, are illustrated at 566. Map 565 maps the datum types ("IDType", "String" and "Float") of the properties 561 of model 560 to logical controls ("Number" and "String"). In this case, both the "IDType" and "Float" datum types map to the "Number" logical control type, while the "String" datum type maps to the "String" logical control type.

Next, logical layer model 570 is mapped to display target model 580 having physical controls 581 specific to a particular display target. Model 570 is mapped to model 580 using map 575, with the process and mapping engine represented at 576. Map 575 maps the logical control types "Number" and "String" of model 570 to the physical control type "TextBox" of model 580, illustrating again that several different types from a particular model can be mapped to a single type on another model. By extension, several different property types from a business model can be mapped to the same final (for example "physical") control.

Developer Experience

When a developer creates a new entity, which is built only from existing types, a default UI is also built via the maps. If the default UI does not offer the desired user experience, the developer can choose to:

Modify the Business Model to reflect the requirements. For example, in some embodiments if sorting a sequence of properties is wrong, say that ID should be displayed before Name, then the entity could be edited. In other embodiments, ordering of properties resides in an external "behavior". However, an ordered grouping of properties can be "added" to the entity—and this can be used to do so. Thus, in these embodiments, the best approach may be to change the order in the grouping.

Modify the generated logical form model. Switching the Name and ID could also be done in the form. This potentially presents some maintenance challenges later if the business logic is changed, such as does the change in the business logic overwrite changes in the form. Also, it may be necessary to change the business logic on every form.

Modify the map. If the ID is mapped to a Number control but a String control is more suitable, the map is the right place to make the change.

There are a number of benefits to changing the map instead of the more traditional modification of models. First of all, the changes can have a wider scope. If the map entry used in the previous example was changed, all entities using the "IDType" would automatically get the update. This would result in a very consistent UI, which the end user would benefit from.

Another benefit becomes evident when looking at maintenance and future versions of an application. By changing the way models are generated, but not changing the generated models, the master model can be updated, and hereafter the depending models can be regenerated without any risk of conflicts. Not regenerating the forms at all could result in inconsistencies between entities and the forms used to view and edit them. Maps also break the large generation task down into several small declarative map entries.

If the developer creates a new property type, such as "Money", this can be used instantly because the UI will be generated efficiently if only a single map entry is added. In this example the new "Money" property could map to a "Number" control. The developer could also choose to exploit the added metadata information, and create a "Money" Control, and have the property map to the new control. The mapping technology makes both scenarios valid.

The Mapping Language

Mapping uses a simple declarative mapping language which is extensible. Mapping takes one or more tokens as input and returns one or more tokens as output. Given a property type as input, one or more logical controls can be specified as output. It must also be possible to specify the output as null. For example, the "IDType" could be a computer generated field, which the user cannot edit or see, in which case the type maps to nothing. Also, the mapping can control parameters on the output. For example, the "String" property could result in a wider TextBox compared to the other TextBoxes on the form.

To handle the scoping problem addressed earlier, a scope condition is needed—on the previously discussed example form, "IDTypes" map to "IDControls", but on all other forms a "Number" control is used. Other parameters can also be used as scope, including the business entity, the entity stereotype, the form type, etc. There are other conditions which it would be beneficial to take into consideration when a map is to be performed. One example is the parent control. If the parent control is a list, an enumerator property might choose to map to a drop-down list and not a radio button. Another condition could be the number of possible selections in the enumerator; radio buttons could be used if there are two or three, but more choices could result in a list. Going down this road, the mapping language will end up being very complex compared to the initial requirement, and another abstraction level on top of the map is needed for developers to understand the maps. This pattern has been seen with Extensible StyleSheet Language Transformations (XSLT), where several tools have been implemented to hide the complexity.

Logical Forms—A UI Model

When mapping from the model of the business logic to the UI model, a layout independent layer, also called a logical layer, is inserted. If it is believed that the model of the business logic can be mapped to the final UI regardless of the display target, the logical layer is a straightforward abstraction. Some metadata will be common for all the display targets such as the business entity itself, and some parts will be specific for the specific display target. The logical layer is the common part.

Figure 6:
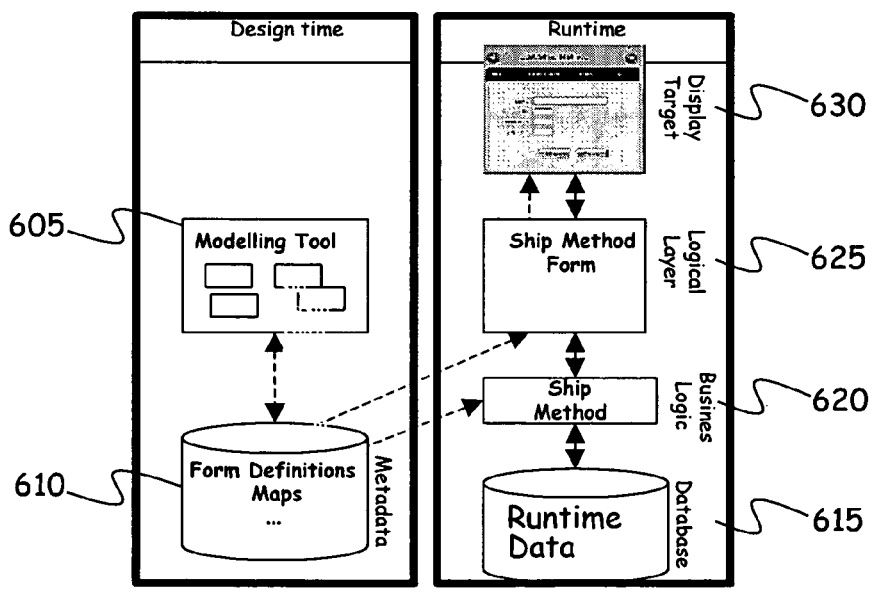
FIG. 6 is a block diagram illustrating design-time and run-time aspects of the present invention, and illustrating that the logical layer is the bridge between the business logic and the display target.

FIG. 6 is a diagrammatic illustration of the design time activities and run-time activities used to create forms. At design time, modeling tools 605 are used to create models or form definitions and maps such as those discussed above. These form definitions and maps can be stored in a metadata database 610.

At run-time, the models or forms are mapped to logical layer model 625. Logical layer model 625 is also generated using run-time data stored in database 615 applied to business logic 620. Also at run-time, logical layer model 625 is mapped to a display target model 630 as described previously.

The logical layer-including forms and controls—is the bridge between the business logic 620 and the display targets 630. It has limited knowledge of layout and limited knowledge of the business logic. The logical layer defines the content of a form based on the business entities, and handles common run-time issues such as data binding forms to the run-time instance of the business entities. Furthermore, the logical layer handles security common to all display targets; it provides metadata to each display target and the logical layer can handle input validation.

A business architect or developer can focus on domain-specific business logic and data. When focus is shifted to the UI, the layout details, data binding issues, plumbing code, input validation, hiding of non-readable properties, error handling, etc., is all hidden in the high level of abstraction found in the logical layer. The domain specialist can focus on the contents of the UI-what makes sense for the user to see-and does not need to have in-depth knowledge about specific display targets and their different rendering technologies.

As discussed, the logical forms or logical layer models are built using logical controls. New controls can easily be added, making the logical layer very flexible and extendable. When a new control is developed, it is simply added to existing forms by changing the used maps. Each display target will benefit from the new functionality without having to implement new controls, but if it makes sense, a new control could be introduced.

Display Targets

Figure 7:
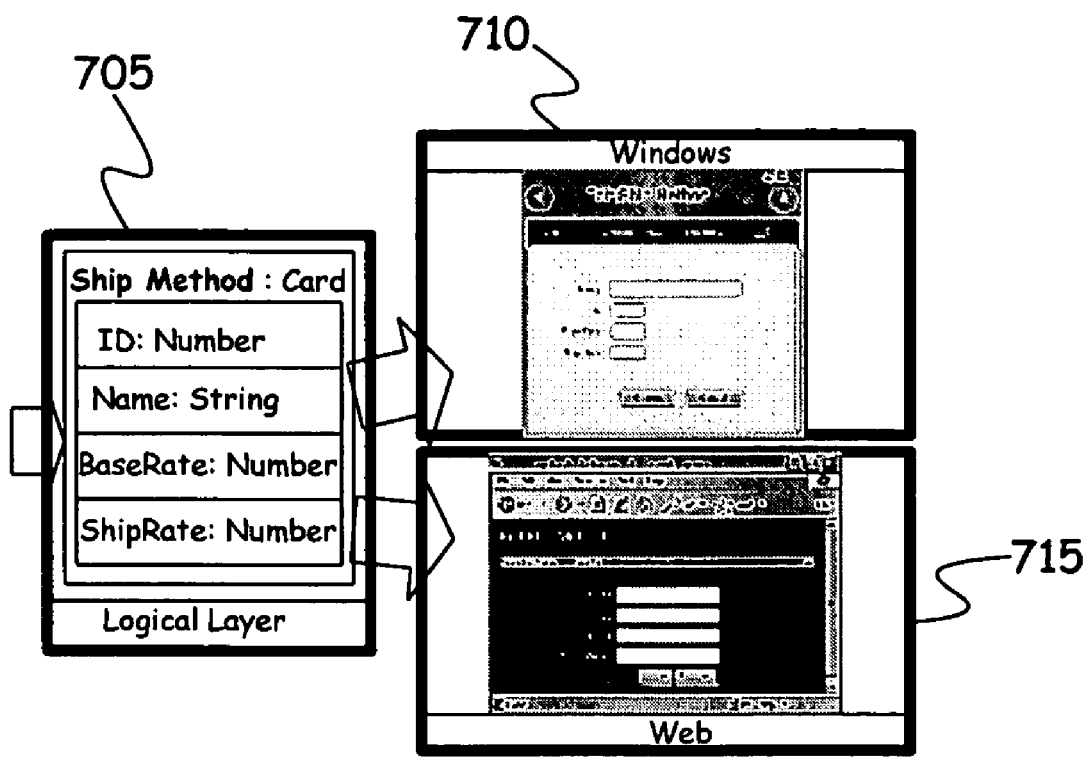
FIG. 7 is a block diagram illustrating logical forms mapped to display target specific rendering technologies.

The logical forms and controls are mapped to specific rendering technologies used by the display targets. As in other FIGS., this is illustrated in FIG. 7 in which logical layer model or form 705 is mapped to several specific display targets. In this particular example, display target 710 uses Windows rendering technology, while display target 715 uses a Web rendering technology. The display targets are responsible for handling all user interactions, including rendering the forms and controls and handling the user input. Each display target needs a number of controls so that the controls in the logical layer are mapped to something meaningful. That is, the property has to be compatible with the value types which the control can handle and the control should render that value in a sensible way. In other words, there are not a specific number of controls that need to be available in each display target, as the mapping technology has a significant impact on this.

The display targets control the user interaction and essentially also the interaction paradigm. A Web page and a Windows Forms window might be generated based on the same logical form, but whether they use a chatty interaction policy or a chunky post back policy is naturally determined by the display target. Each display target chooses how much of a form that is displayed to the user. A Windows form can hide information on tab pages, while a Web page can choose to show all the information at once. These decisions are made based on the logical form, and thus also the form type, which the display targets obtain. Different display targets need additional information to make such paging decisions, and similarly the logical forms and controls can be annotated with display target specific information.

Behaviors—Declarative Form Logic

As the forms are made up of logical controls, which define the content, there is still a need to add dynamics to the forms. This could be done using code. But it is not easy to map code onto a form, and therefore a declarative abstraction level is needed. At the same time, there are many patterns in the code, which are added to forms. For example, code to disable a field if another field is filled out is found in many forms. If "Cash" is selected as a payment type on a form, the "Credit Card Number" is grayed or even hidden.

These patterns are captured in a concept called "behaviors." Behaviors are declaratively added to the forms and are activated via events in the form. The behaviors can, depending on values and properties of the controls, set properties on other controls, but behaviors are not limited to this use. Behaviors are mainly mapped based on constraints in the entities, or on other metadata properties. Entities are responsible for handling the business logic, and behaviors are responsible for the UI logic. In other words, behaviors should not implement any business logic as this would violate the separation of concerns.

Layered System and Method Example

Figure 8:
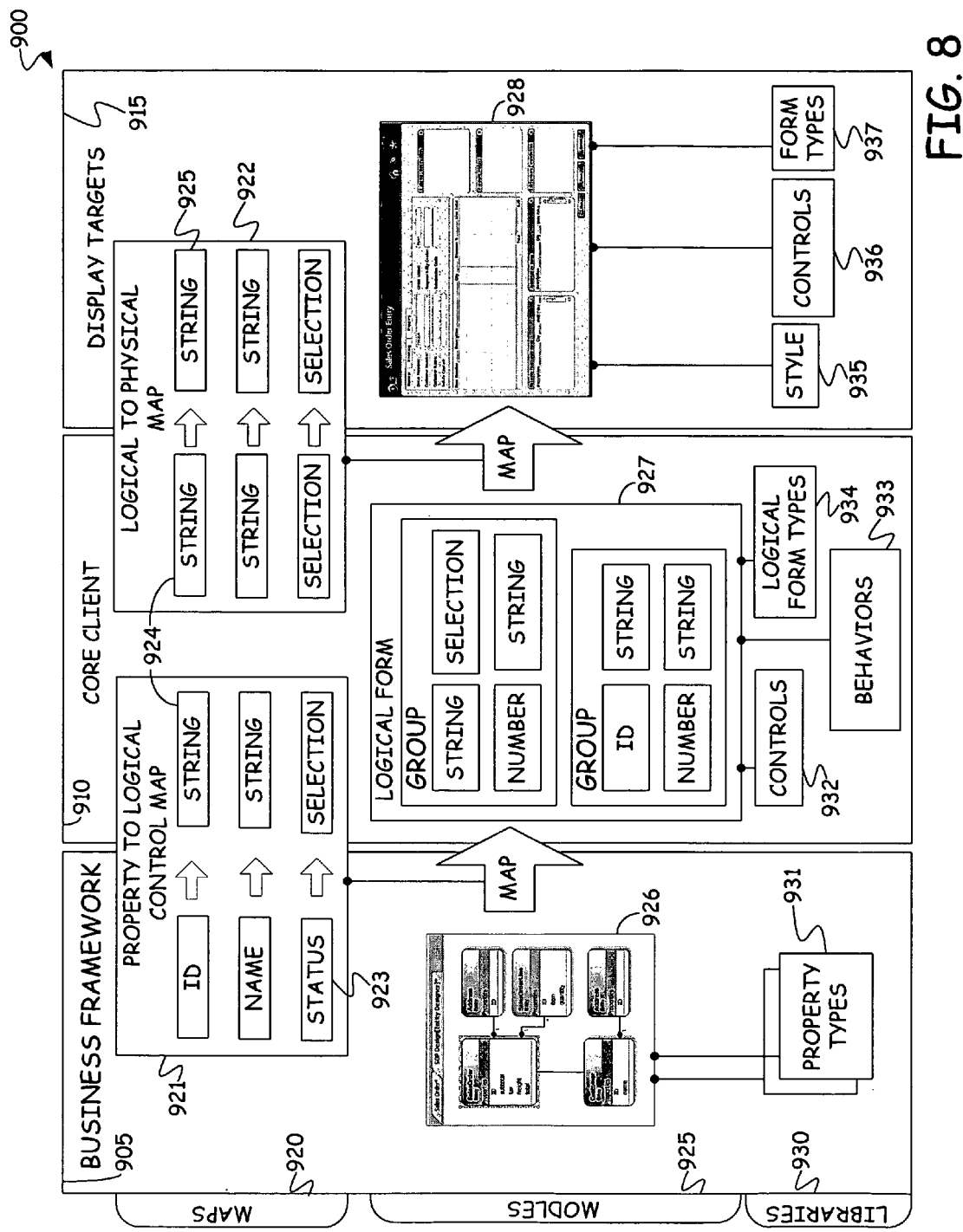
FIG. 8 is a diagrammatic illustration of concepts of the present invention.

Referring now to FIG. 8, shown is a diagrammatic illustration of a layered system and method which implements the various concepts described above (i.e., logical form types, UI maps, controls, behaviors, etc) in combination. As shown in FIG. 8, system or method 900 is implemented using a business framework 905 which can include business applications and computing systems, a core client mapping engine or component 910 and one or more display targets 915. For illustrative purposes, FIG. 8 is segmented to show maps 920 (including maps 921 and 922), models 925 (including application or business model 926, logical form model 927 and physical model 928), and libraries 930.

Libraries 930 include property types library 931, in business framework 905, which defines the various property types 923 of datum in application model 926. In core client 910, libraries 930 include logical controls library 932, behaviors library 933, and logical form types library 934. As described above, logical controls library 932 defines the various logical controls 924 which the datum or property types 923 of model 926 can be mapped to. This mapping between application model 926 and logical form model 927 is performed by the core client mapping engine using map 921.

Behaviors library 933 and logical form types library 934 are used by the core client mapping engine 910 in the process of designing and generating forms as was described previously. Libraries 930 also include style library 935, physical or native controls library 936, and form types library 937 which are used by the display target 900 to generate the physical form model 928, and thus to render the physical form. Controls library 936 defines the various physical controls 925 for a particular display target which logical controls 924 can be mapped to using map 922.

Although the present invention has been described with reference to particular embodiments, workers skilled in the art will recognize that changes may be made in form and detail without departing from the spirit and scope of the invention.

What is claimed is:

1. A method of generating model driven form user interfaces to represent an application model using multiple display target rendering technologies on multiple different type of platforms, the method comprising:
   selecting which of a plurality of different logical form types to use to generate the form user interfaces to represent the application model, form type is a model which dictates a form schema to be used to represent the application model;
   providing a first map based upon the selected logical form type;
   generating a display target independent logical form using the application model, the selected form type and the first map by mapping property types of datum of the application model to display target independent logical controls in the display target independent logical form:
   mapping the display target independent logical form to use a display target on a first type of platform to generate a second user interface, to represent the application model, on the first type of platform; and
   mapping the display target independent logical form to a second display target on a second type of platform to generate a second user interface, to represent the application model, on the second type of platform, wherein the layout of the first user interface on the first type of platform and the layout of the second user interface on the second type of platform are independent of each other under the separate control of the first and second display targets.

2. The method of claim 1, wherein the first map is a first declarative map, and wherein generating the display target independent logical form using the first declarative map further comprises mapping property types of datum of the application model to display target independent logical controls in the display target independent logical form.

3. The method of claim 2, wherein generating the display target independent logical form comprises generating a display target independent logical form model.

4. The method of claim 2, wherein generating the display target independent logical form using the application model, the selected form type and the first declarative map further comprises also attaching declaratively applied behaviors to the display target independent logical form.

5. The method of claim 4, wherein the declaratively applied behaviors are activated by events in the form.

6. The method of claim 5, wherein the declaratively applied behaviors are patterns of logic which, depending upon values and properties of the logical controls, set properties on other controls.

7. The method of claim 2, wherein the first declarative map is external to a mapping engine used to generate the display target independent logical form.

8. The method of claim 7, wherein the first declarative map is a model used by the mapping engine to generate the logical control model.

9. The method of claim 2, and further comprising the further step of mapping the logical form to a physical form using a second declarative map.

10. The method of claim 9, wherein the physical form has a plurality of physical controls available for use in rendering the logical form on a display target, and wherein mapping the logical form to the physical form using the second declarative map further comprises using the second declarative map to map each of the logical controls in the logical form to one of the plurality of available physical controls.

11. The method of claim 10, and further comprising rendering the form user interface at run-time using the generated logical form such that the application model is acted on at run-time.

12. The method of claim 11, wherein rendering the form user interface at run-time further comprises generating the logical form at run-time using both the selected logical form type and meta data from the application model.

13. The method of claim 12, wherein each of the plurality of different logical form types has an associated schema which defines application model data to be included in the generated logical form, and wherein generating the logical form at run-time further comprises generating the logical form using the associated schema.

14. The method of claim 13, wherein the schema of each of the plurality of different logical form types represents patterns captured from a plurality of forms.

15. The method of claim 13, wherein each of the plurality of logical form types has at least one defined layout, the method further comprising generating the physical form at run-time using the at least one defined layout.

16. The method of claim 1, wherein the first display target is a desktop application and the first type of platform is a desktop environment platform.

17. The method of claim 16, wherein the desktop application is a WinForm application.

18. The method of claim 16, wherein the second display target is a web client display target and the second type of platform is a web environment platform.

19. The method of claim 16, wherein the second display target is a mobile device display target and the second type of platform is a mobile computing platform.

20. The method of claim 19, wherein the mobile computing platform is one of a cell phone and a personal digital assistant.

21. The method of claim 1, wherein the first display target is a web client display target, the first type of platform is a web environment platform, the second display target is a mobile device display target and the second type of platform is a mobile computing platform.

* * * * *